UNITED STATES PATENT OFFICE.

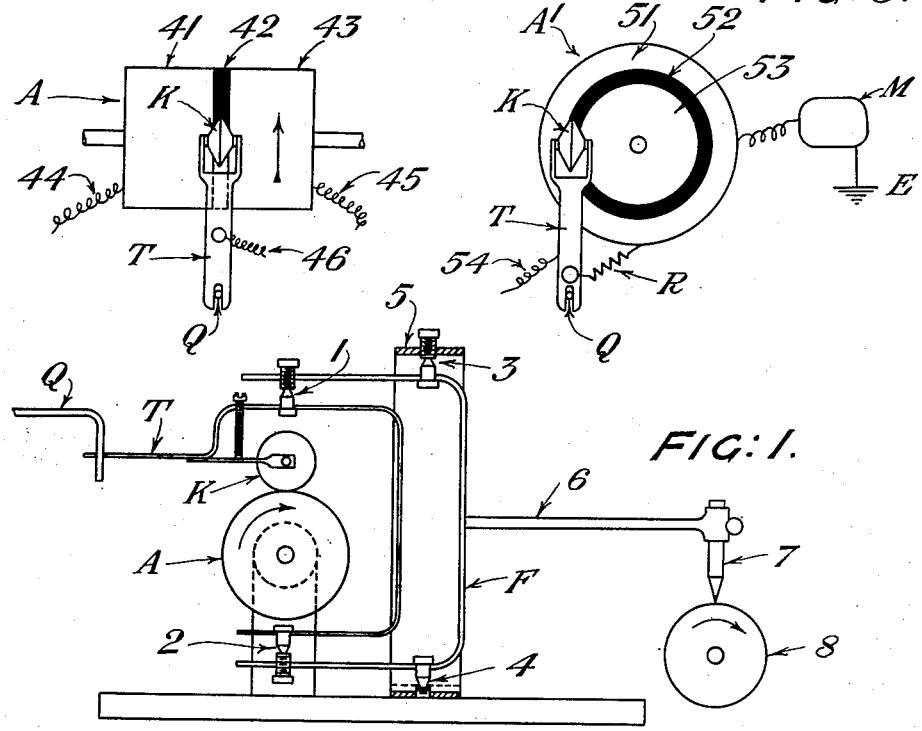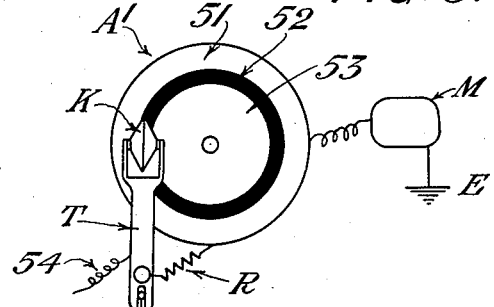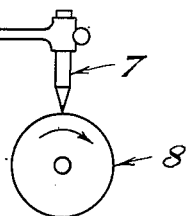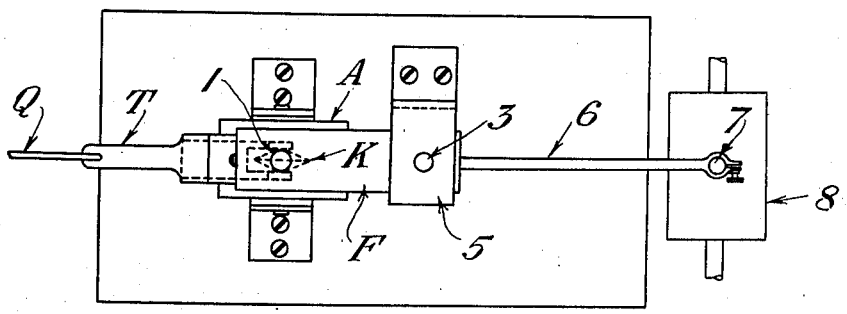

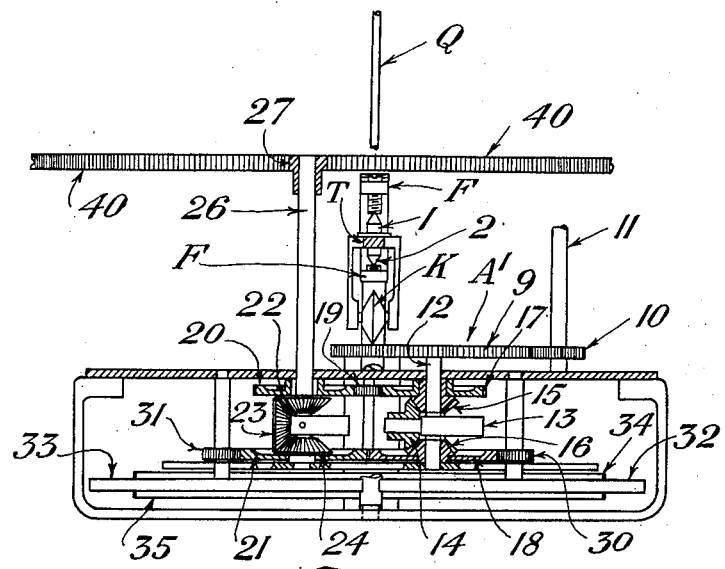
FIG: 3.
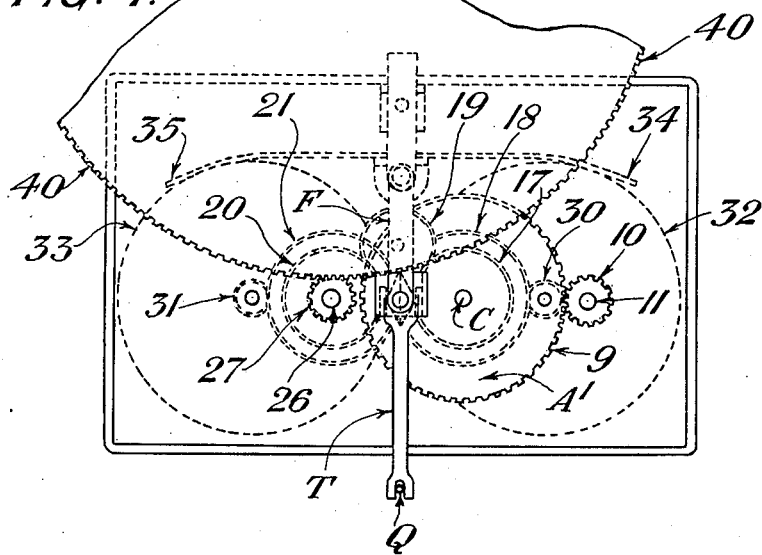
FIG: 4.

ARCHIBALD BARR AND WILLIAM STROUD, OF ANNIESLAND, GLASGOW, SCOTLAND, ASSIGNORS TO BARR AND STROUD, LIMITED, OF ANNIESLAND, GLASGOW, SCOTLAND.

MECHANICAL AND ELECTRICAL RELAY.

1,331,893.  Specification of Letters Patent.  Patented Feb. 24, 1920.

Application filed April 25, 1918. Serial No. 230,748.

*To all whom it may concern:*

Be it known that we, ARCHIBALD BARR and WILLIAM STROUD, subjects of the King of Great Britain and Ireland, and both of Caxton street, Anniesland, Glasgow, Scotland, have invented new and useful Improvements in Mechanical and Electrical Relays, of which the following is a specification.

The object of our invention is to provide improved relay apparatus whereby an extremely minute force or an extremely minute motion may effectively control an external source of power, so as to produce a comparatively powerful motion in a forward or backward direction.

Our invention, which is applicable to "following" or "hunting" mechanisms of a large variety of types, consists of a traveling surface moving in one direction, a tiller pivoted about an axis which intersects the traveling surface normally or approximately so, a steering device having an edge carried by the tiller which rests upon the traveling surface at or near the position where the axis intersects the traveling surface, the steering device normally occupying a fiducial position in which the edge lies parallel to the direction of motion of the traveling surface, and a support for the pivot of the tiller which permits the axis thereof to move laterally to the direction of motion of the traveling surface.

One form of construction comprises parts as follows:—

(1) A traveling surface, for instance, a rotating drum or disk A driven in one direction by an external source of power.

(2) A tiller T pivoted about an axis and carrying a steering device, for instance, a steering wheel K having an edge resting on the traveling surface normally with its edge parallel to the direction of motion of the traveling surface, the axis passing through or close to the point of contact of traveling surface and steering device, and (3) A frame F capable of translation laterally to the direction of motion of the traveling surface in the region of the point of contact. For instance, this translation may be effected by a rotation about a suitable axis perpendicular to the traveling surface. The axis of the tiller T is carried by the frame F.

By moving the tiller T angularly about the axis of its pivot the direction of the edge of the steering wheel resting on the traveling surface is altered, with the result that the steering wheel K tends to move laterally with reference to the motion of the traveling surface at the point of contact thereby rotating the frame F in its bearings.

The force capable of being exerted by the frame F in its motion is determined by the frictional force between the edge of the steering wheel and the traveling surface measured perpendicularly to the direction of motion of the latter, and this force may be made very great compared with the very small force required for moving the tiller.

Although a wheel which rotates freely is suitable, the steering effect could be obtained by a non-rotating steering device, for instance, a non-rotating knife edge might be used to bear upon the traveling surface.

Apparatus according to this invention is particularly applicable for use in recording the motions of a mechanism or transmitting the motions of a mechanism while exerting little resistance to the movements of the mechanism itself. Motions applied to the tiller may be recorded, for instance, by means of a pencil fixed to the frame F, the pencil being arranged to indicate its motion upon a moving paper upon which it is pressed. Further, the frame F may be arranged to control the operations of motor driven mechanism "following" or "hunting" mechanisms, e. g., for use in conjunction with a gyro-compass, we may provide electrical or other motor arranged to be controlled by the frame F. For instance, we may use a power device of the character shown on the right hand side at Fig. 7 of specification of United States Patent No. 1,050,512, granted to Archibald Barr and William Stroud, the present applicants, in which a double differential gear and an idle wheel are employed to convert the continuous motion of an electrical motor into a forward or backward motion by stopping one or other of the flies 4 or $4^1$. Thus, in this case, the frame F would be arranged so that its motion to the right would stop (say) fly 4 and its motion to the left fly $4^1$.

In certain cases we may use the steering wheel K itself to make one or other of two electrical contacts, thus, e. g., the traveling surface may be provided with two conducting races with an insulating race between them upon which the steering wheel, made of metal, runs when in its fiducial position. As soon, however, as the tiller is turned by B the traveling surface immediately causes K to run so as to make contact on one or other of the races and these contacts may be arranged in well-known ways to effect the forward or backward motion of the following mechanism.

Many sensitive hunting mechanisms have a tendency to oscillate about their fiducial position. In the present invention we may greatly reduce or overcome this tendency by varying the speed of the traveling surface in accordance with the displacement of the steering device from its fiducial position. For example, we may provide two conducting races on the traveling surface with an insulating race of appropriate width between them and arrange matters so that the continuously running motor may go slowly when K is on the insulating part of the traveling surface and go much faster when on a conducting race.

We shall now describe our invention with reference to the accompanying drawings in which Figure 1 represents an elevation, and Fig. 2 a plan of one form of our invention in which no following mechanism is incorporated, but associated with means for recording, say, the motion of a galvanometer, while Figs. 3 and 4 represent respectively plan and elevation of another form including one type of following mechanism. Figs. 5 and 6 show two applications in which electrical currents are employed.

In Figs. 1 and 2, A is a drum continuously driven, say, in the direction of the arrow. Upon this drum there is gently pressed a steering wheel K with a tiller T which is mounted in pivots 1 and 2 carried by frame F. Frame F is mounted on pivots 3 and 4 carried by stand 5. Fixed to frame F is an arm 6 carrying pencil 7 recording on rotating drum 8. The wheel K rests upon the drum A at the position where the axis of the pivots 1, 2, intersect the surface of the drum, and the axis of the parts 3, 4, is arranged parallel with the axis of 1, 2, at a distance therefrom. Suppose we desire to have a record of the motions of the moving coil of a galvanometer. Attached to the coil is a light arm Q bent down at the end and forked into the end of the tiller T. If now Q moves out from the paper in Fig. 1, K will be rotated slightly upon the drum, the latter will roll on a spiral line on the drum and therefore K will be brought out from the paper and so rotate frame F about pivots 3 and 4 so as to move pencil 7 in to the paper, Fig. 1. If the moving coil moves in the opposite direction the pencil 7 will move out from the paper.

In Figs. 3 and 4 the drum is now replaced by a disk $A^1$ forming the upper part of toothed wheel 9 driven by pinion 10 and shaft 11 by means of a continuously running motor carried by a following mechanism. Fixed to 9 is a shaft 12 carrying spindle 13 upon which is mounted bevel wheel 14 gearing with bevels 15 and 16 which therefore are continuously driven in the same direction. Fixed to 15 and 16 are toothed wheels 17 and 18 respectively. 17 gears through an idle wheel 19 with toothed wheel 20, while 18 gears directly with 21. Bevels 22 and 24 are fixed to 20 and 21 respectively, while the spindle of jockey 23 is fixed to spindle 26 carrying pinion 27. The pinion 27 gears with a large diameter toothed wheel 40 (a portion of which only is shown in Figs. 3 and 4) which is stationary.

It is to be understood that the whole of the mechanism shown in Figs. 3 and 4 including the motor driving shaft 11, with the exception of the wheel 40, is mounted on the following mechanism. Any motion therefore of pinion 27 with reference to the stationary toothed wheel 40 will mean that the whole of the following mechanism will be carried around the center of this stationary wheel 40. The toothed wheels 18 and 21 gear respectively with toothed wheels 30 and 31 carrying fly wheels 32 and 33 respectively. Carried by the frame F are two springs 34 and 35 lightly resting on 32 and 33 respectively. Stoppage of 32 means that $A^1$ drives 27 through the idle wheel 19 in the same direction as itself while stoppage of 33 means that 27 is driven in the opposite direction after the manner described in the specification of United States Patent No. 1,050,512. Thus, the direction of motion of 27 is determined by the relative rates of rotation of fly wheels 32 and 33 so that if a brake is put on 32, 27 will rotate in one direction and in the opposite if 33 is braked. Suppose now that we are following the motion of a gyro-compass, we attach to the arm Q forked into the tiller T a portion of the compass which is rotatable about the vertical axis of the wheel 40. Suppose Q (Fig. 4) moves to the right and $A^1$ is rotating counterclockwise then K will be moved away from the center C of disk $A^1$ carrying with it frame F to which springs 34 and 35 are fixed. In this way the pressure between 35 and 33 will be decreased while that between 34 and 32 will be increased. By following out the direction of motions of the various wheels in the train it will be found that the effect of this will be that 26 will rotate counterclockwise and thus carry around the whole of the following mechanism in the direction Q has moved, until tiller T occupies the position shown in the figure with reference to Q. Similarly, if Q moves to the left, K will move toward the center C, the brake will be applied to 33, and 26 will move clockwise until the tiller is in its fiducial position.

In some cases the point of contact of steering wheel K and traveling surface A may be slightly in front of or slightly behind the axis about which the tiller T turns. In this case, however, slight forces will be transmitted from the frame F through the tiller T to the arm Q.

Fig. 5 shows a plan of an arrangement in which electrical currents are employed. The drum A consists of three parts 41, 42 and 43 of which 42 is an insulating cylinder placed between two conducting cylinders 41 and 43 against which are pressed two contacts 44 and 45. One end of the battery is connected by lead 46 to the tiller T. If now Q moves to the right and the drum A is rotating in the direction of the arrow, K will roll along a spiral line upon A until it makes contact with 43 when a current will flow through 45 to an electro-magnet (not shown) which may be arranged to put a brake upon or to stop the motion of (say) flywheel 32 (Fig. 4). Similarly, if Q moves to the left K will roll on to 41, a current will flow through 44 to an electro-magnet (not shown) which will put a brake upon or stop flywheel 33 (Fig. 4).

Fig. 6 shows an arrangement for speeding up the driving motor when the body being followed is moving with some rapidity. Here the driven disk $A^1$ has an insulating ring 52 inserted in its surface, the two portions 51 and 53 being electrically connected. So long as Q moves only slowly the wheel K remains on 52 and the motor M is driven by the current coming from lead 54 to tiller T, thence through resistance R to 51 and from there to motor M and earth E. So soon, however, as Q moves rapidly K moves on to parts 51 or 53 the resistance R is short-circuited and the motor M is much more rapidly driven.

Relay apparatus according to this invention is applicable for many purposes in addition to those referred to.

We claim:

1. Relay apparatus consisting of a traveling surface moving in one direction, a tiller pivoted about an axis which intersects the traveling surface normally or approximately so, a steering device having an edge carried by the tiller which rests upon the traveling surface at or near the position where the axis intersects the traveling surface, the steering device normally occupying a fiducial position in which the edge lies parallel to the direction of motion of the traveling surface, a support for the pivot of the tiller which permits the axis thereof to move laterally to the direction of motion of the traveling surface, for the purposes set forth.

2. Relay apparatus consisting of a traveling surface moving in one direction, a tiller pivoted about an axis which intersects the traveling surface normally or approximately so, a steering wheel having an edge carried by the tiller arranged so that its axis is parallel to the traveling surface and at right angles to the motion thereof when in its fiducial position, which steering wheel rests upon the traveling surface at or near the position where the axis of the tiller pivot intersects the traveling surface, a support for the pivot of the tiller which permits the axis thereof to move laterally to the direction of motion of the traveling surface, for the purposes set forth.

3. Relay apparatus consisting of a traveling surface moving in one direction, a tiller pivoted about an axis which intersects the traveling surface normally or approximately so, a steering device having an edge carried by the tiller which rests upon the traveling surface at or near the position where the axis intersects the traveling surface, the steering device normally occupying a fiducial position in which the edge lies parallel to the direction of motion of the traveling surface, and a support for the pivot of the tiller pivoted about an axis so as to permit the axis about which the tiller turns to move laterally to the direction of motion of the traveling surface, for the purposes set forth.

4. Relay apparatus consisting of a traveling surface moving in one direction, a tiller pivoted about an axis which intersects the traveling surface normally or approximately so, a steering device having an edge carried by the tiller which rests upon the traveling surface at or near the position where the axis intersects the traveling surface, the steering device normally occupying a fiducial position in which the edge lies parallel to the direction of motion of the traveling surface, and a support for the pivot of the tiller pivoted about an axis parallel to the axis about which the tiller turns, for the purposes set forth.

5. Relay apparatus consisting of a rotating disk rotating in one direction, a tiller pivoted about an axis which intersects the surface of the disk normally or approximately so, a steering device having an edge carried by the tiller which rests upon the surface of the disk at or near the position where the axis intersects its surface, the steering device normally occupying a fiducial position in which the knife edge lies parallel to the direction of motion of the traveling surface, and a support for the pivot of the tiller which permits the axis thereof to move laterally to the direction of motion of the portion of the surface of the disk on which the steering device rests, for the purposes set forth.

6. Relay apparatus consisting of a traveling surface moving in one direction, a tiller pivoted about an axis which intersects the traveling surface normally or approximately so, a steering device having an edge carried by the tiller which rests upon the traveling surface at or near the position where the axis intersects the traveling surface, the steering device normally occupying a fiducial position in which the edge lies parallel to the direction of motion of the traveling surface, a support for the pivot of the tiller which permits the axis thereof to move laterally to the direction of motion of the traveling surface, in combination with means for varying the speed of the traveling surface in accordance with the displacement of the steering device from its fiducial position, for the purposes set forth.

7. Relay apparatus consisting of a traveling surface moving in one direction, having two electrical conducting races, with an insulating race between them, a tiller pivoted about an axis which intersects the traveling surface normally or approximately so, a steering device having an edge carried by the tiller which rests upon the traveling surface at or near the position where the axis intersects the traveling surface, the steering device normally occupying a fiducial position in which the edge lies parallel to the direction of motion of the traveling surface, and which is arranged to rest upon the insulating race when in its fiducial position, a support for the pivot of the tiller which permits the axis thereof to move laterally to the direction of motion of the traveling surface, for the purposes set forth.

8. Relay apparatus consisting of a traveling surface moving in one direction, a tiller pivoted about an axis which intersects the traveling surface normally or approximately so, a steering device having an edge carried by the tiller which rests upon the traveling surface at or near the position where the axis intersects the traveling surface, the steering device normally occupying a fiducial position in which the edge lies parallel to the direction of motion of the traveling surface, a support for the pivot of the tiller which permits the axis thereof to move laterally to the direction of motion of the traveling surface, a mechanism, motions of which are applied to the tiller, and a following or hunting mechanism the operations of which are controlled by the lateral movements of the pivot of the tiller, for the purposes set forth.

9. Relay apparatus consisting of a traveling surface moving in one direction, a tiller pivoted about an axis which intersects the traveling surface normally or approximately so, a steering wheel having an edge carried by the tiller which rests upon the traveling surface at or near the position where the axis intersects the traveling surface, the steering device normally occupying a fiducial position in which the edge lies parallel to the direction of motion of the traveling surface, and a support for the pivot of the tiller pivoted about an axis so as to permit the axis about which the tiller turns to move laterally to the direction of motion of the traveling surface, for the purposes set forth.

10. Relay apparatus consisting of a traveling surface moving in one direction, a tiller pivoted about an axis which intersects the traveling surface normally or approximately so, a steering wheel having an edge carried by the tiller which rests upon the traveling surface at or near the position where the axis intersects the traveling surface, the steering device normally occupying a fiducial position in which the edge lies parallel to the direction of motion of the traveling surface, and a support for the pivot of the tiller pivoted about an axis parallel to the axis about which the tiller turns, for the purposes set forth.

11. Relay apparatus consisting of a rotating disk rotating in one direction, a tiller pivoted about an axis which intersects the surface of the disk normally or approximately so, a steering wheel having an edge carried by the tiller which rests upon the surface of the disk at or near the position where the axis intersects its surface, the steering device normally occuping a fiducial position in which the edge lies parallel to the direction of motion of the traveling surface, and a support for the pivot of the tiller which permits the axis thereof to move laterally to the direction of motion of the portion of the surface of the disk on which the steering wheel rests, for the purposes set forth.

12. Relay apparatus consisting of a traveling surface moving in one direction, a tiller pivoted about an axis which intersects the traveling surface normally or approximately so, a steering wheel having an edge carried by the tiller which rests upon the traveling surface at or near the position where the axis intersects the traveling surface, the steering device normally occupying a fiducial position in which the edge lies parallel to the direction of motion of the traveling surface, a support for the pivot of the tiller which permits the axis thereof to move laterally to the direction of motion of the traveling surface, in combination with means for varying the speed of the traveling surface in accordance with the displacement of the steering wheel from its fiducial position, for the purposes set forth.

13. Relay apparatus consisting of a traveling surface moving in one direction, having two electrical conducting races, with an insulating race between them, a tiller pivoted about an axis which intersects the traveling surface normally or approximately so, a steering wheel having an edge carried by the tiller which rests upon the traveling surface at or near the position where the axis intersects the traveling surface, the steering device normally occupying a fiducial position in which the edge lies parallel to the direction of motion of the traveling surface, and which is arranged to rest upon the insulating race when in its fiducial position, a support for the pivot of the tiller which permits the axis thereof to move laterally to the direction of motion of the traveling surface, for the purposes set forth.

14. Relay apparatus consisting of a traveling surface moving in one direction, a tiller pivoted about an axis which intersects the traveling surface normally or approximately so, a steering wheel having an edge carried by the tiller which rests upon the traveling surface at or near the position where the axis intersects the traveling surface, the steering device normally occupying a fiducial position in which the edge lies parallel to the direction of motion of the traveling surface, a support for the pivot of the tiller which permits the axis thereof to move laterally to the direction of motion of the traveling surface, a mechanism, motions of which are applied to the tiller, and a following or hunting mechanism the operations of which are controlled by the lateral movements of the pivot of the tiller, for the purposes set forth.

ARCHIBALD BARR.
WILLIAM STROUD.

Witnesses:
OSWIN EDWIN HOWARD BIRCHALL,
WILLIAM PENDRICH.